(12) United States Patent
Johnson et al.

(10) Patent No.: US 6,856,484 B2
(45) Date of Patent: Feb. 15, 2005

(54) MAGNETIC SERVO OF A RECORDING HEAD

(75) Inventors: Robert Johnson, Acton, MA (US); George Bellesis, Jefferson, MA (US)

(73) Assignee: Quantum Corporation, San Jose, CA (US)

( * ) Notice: Subject to any disclaimer, the term of this patent is extended or adjusted under 35 U.S.C. 154(b) by 229 days.

(21) Appl. No.: 09/946,583

(22) Filed: Sep. 5, 2001

(65) Prior Publication Data

US 2003/0043498 A1 Mar. 6, 2003

(51) Int. Cl.[7] .............................................. G11B 5/584
(52) U.S. Cl. ................... 360/77.12; 360/75; 360/78.11
(58) Field of Search ............................. 360/74.6, 77.12, 360/77.03, 77.08, 121, 134, 78.11, 25, 77.13, 313, 318, 317, 131, 75, 14, 78.02, 76

(56) References Cited

U.S. PATENT DOCUMENTS

| | | | |
|---|---|---|---|
| 4,123,788 A | 10/1978 | Kruger | |
| 4,558,383 A | 12/1985 | Johnson | |
| 4,570,191 A | 2/1986 | Di Stefano et al. | |
| 4,816,939 A | 3/1989 | Ford et al. | |
| 4,961,123 A | 10/1990 | Williams et al. | |
| 5,079,663 A | 1/1992 | Ju et al. | |
| 5,105,322 A | * 4/1992 | Steltzer | 360/26.3 |
| 5,371,638 A | * 12/1994 | Saliba | 360/77.12 |
| 6,018,434 A | 1/2000 | Saliba | |
| 6,075,678 A | 6/2000 | Saliba | |
| 6,084,740 A | 7/2000 | Leonhardt et al. | |
| 6,134,070 A | * 10/2000 | Tran et al. | 360/75 |
| 6,246,535 B1 | 6/2001 | Saliba et al. | |
| 6,275,349 B1 | 8/2001 | Smith | |
| 6,430,008 B1 | * 8/2002 | Trabert et al. | 360/317 |
| 6,433,951 B1 | * 8/2002 | Lubratt | 360/77.12 |
| 6,493,174 B1 | * 12/2002 | Stubbs | 360/77.12 |
| 6,563,662 B2 | * 5/2003 | Smith | 360/77.03 |

FOREIGN PATENT DOCUMENTS

| | | |
|---|---|---|
| WO | WO 00/33301 | 6/2000 |

* cited by examiner

*Primary Examiner*—Sinh Tran
*Assistant Examiner*—Jason Olson
(74) *Attorney, Agent, or Firm*—Morrison & Foerster LLP (57) ABSTRACT

A method of aligning a magnetic read/write head to data tracks on a magnetic surface of a digital linear tape. The method includes writing a signal over a track of optical servo marks located on the magnetic surface of the tape with a servo channel writer, generating a position error signal from read back signals obtained from a servo channel reader and positioning the magnetic read/write head in accordance with the position error signal.

19 Claims, 7 Drawing Sheets

MAGNETIC SERVO OF A RECORDING HEAD

TECHNICAL FIELD

This invention relates to magnetic servo of a recording head.

BACKGROUND

To increase data storage and retrieval performance, many digital linear magnetic tape recording systems utilize multi-head, multi-channel fixed head structures with narrowed recording gaps and track widths so that many linear data tracks may be achieved on a tape medium of predetermined width. Tape substrates are also being made thinner with increased tape lengths in small diameter packages.

Head positioning servo systems are employed in many contexts requiring accurate positioning of a read and/or write head in a magnetic tape system over a selected data track. Misalignment between the head and the data track may cause data errors during read back and data loss on adjacent tracks during writing.

In multi-track magnetic tape storage systems, random lateral tape motion ("LTM") is a limiting factor in achieving higher densities and thus higher user data capacity per tape. LTM is an undesirable motion of the tape in a lateral direction that is transverse to the tape direction. LTM may be caused by many factors including tape slitting variations, tension variations, imperfections in the guiding mechanism, friction variations in the recording head, and environmental factors such as heat and humidity. These factors affect LTM in various ways. Some cause abrupt momentary jumps of the tape in a directed lateral to its travel, while others may cause small shift in a lateral direction during tape travel. Generally, LTM is unpredictable and unrepeatable and must be compensated for.

SUMMARY

In an aspect, the invention features a method of aligning a magnetic read/write head to data tracks on a magnetic surface of a digital linear tape. The method includes writing a signal over a track of optical servo marks located on the magnetic surface of the tape with a servo channel writer, generating a position error signal from read back signals obtained from a servo channel reader and positioning the magnetic read/write head in accordance with the position error signal.

One or more of the following features may also be included.

The track of optical servo marks is applied during manufacture of the tape and may be formed by printing, embossing, patterning/ablation by a laser beam. The signal may be produced by writing a DC signal, an AC signal, and so forth. The servo channel reader may a center-tapped reader having a first read head and a second read head. The read back signals include a first frequency from the first read head and a second frequency from the second read head. The position error signal includes a difference between the second frequency signal and the second frequency signal, wherein an absolute value of the difference is a magnitude of an offset and a sign is a direction of the offset. The magnitude may be correlated to micrometers. Positioning the magnetic read/write head in accordance with the position error signal includes driving the read/write head up relative the track of optical servo marks if the sign is negative and down if the sign is positive.

In another aspect, the invention features a magnetic recording head servo system includes recording channels, at least one magnetic servo channel, the magnetic servo channel generating servo signals from a track of optical servo marks, a servo processing system connected to the magnetic servo channel for processing the servo signals and a motor connected and responsive to servo instructions received from the servo processing system, the motor controlling a position of the recording head servo system relative the position of the track of optical servo marks.

One or more of the following features may also be included.

The servo channel includes a write head, first read head and a second read head. The write head writes a signal tone. The first read head and the second read head detect frequencies of a signal tone. The servo processing system may include a means for determining a difference between frequencies detected by the first read head and the second read head, a means for converting the difference into a linear position instruction and a means for sending the linear position instruction to the motor.

Embodiments of the invention may have one or more of the following advantages.

No separate optical servo system for determining where the head is with respect to optical servo marks is needed, thus reducing overall weight and eliminating a need for precise alignment of the optical servo system and the magnetic heads.

Use of optical servo marks eliminates the chance of the erasure of magnetic servo marks that have been placed on the tape at the time of manufacture.

The regions of media ablation, i.e., optical servo marks, are permanent and not subject to bulk erasure as in purely magnetic servo written information.

The additional servo channel head or heads do not increase processing cost during magnetic head unit manufacturing and occupy a minimum of wafer real estate.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
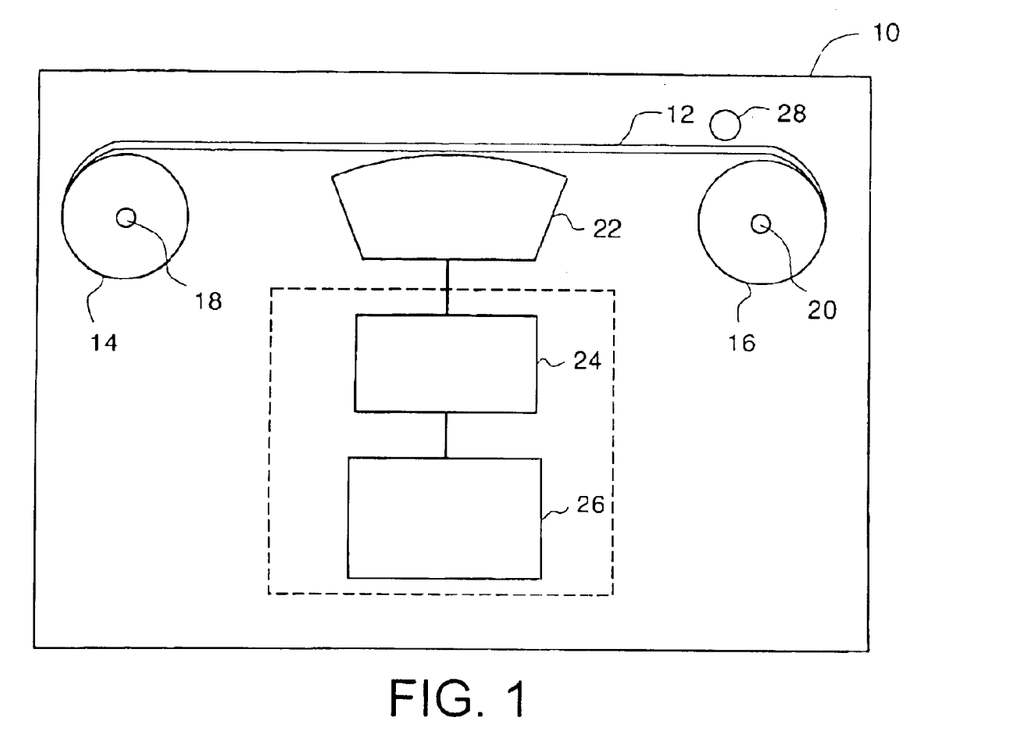
FIG. 1 is a block diagram of an exemplary magnetic tape recording system.

Referring to FIG. 1, an exemplary magnetic tape system 10 for recording at high track densities includes a digital linear tape 12 positioned between tape reels 14 and 16. The tape reels 14 and 16 are mounted on rotatably driven reel drive motors 18 and 20. The reel drive motors 18 and 20 rotate the tape reels 14 and 16 to move the digital linear tape 12 in a forward direction from reel 14 to reel 16. As the digital linear tape 12 advances, it moves across a recording head 22 that writes linear tracks of data onto the digital linear tape 12. The recording head 22 contains both write and read heads, allowing, among other things, read checking of written data. When the entire length of the digital linear tape 12 has been transferred from the tape reel 14 to the tape reel 16, the direction of rotation of the reel motors 18 and 20 is reversed. The digital linear tape 12 now advances across the recording head 22 in a reverse direction. As the digital linear tape 12 begins advance in the reverse direction, the recording head 22 is stepped in a lateral direction across the digital linear tape 12 by a recording head assembly 24, enabling the recording of another track of information on the digital linear tape 12.

A controller 26 provides data to be written by the recording head 22, and control information to the recording head assembly 24. The advancement of the digital linear tape 12 continues in forward and reverse directions with the recording head 22 stepped latterly across the digital linear tape 12, resulting in multiple parallel recorded tracks of data. The position of the recording head 22 relative to the lengthwise location on the digital linear tape 12 is continuously monitored by position sensing means such as an optical tachometer 28.

Figure 2:
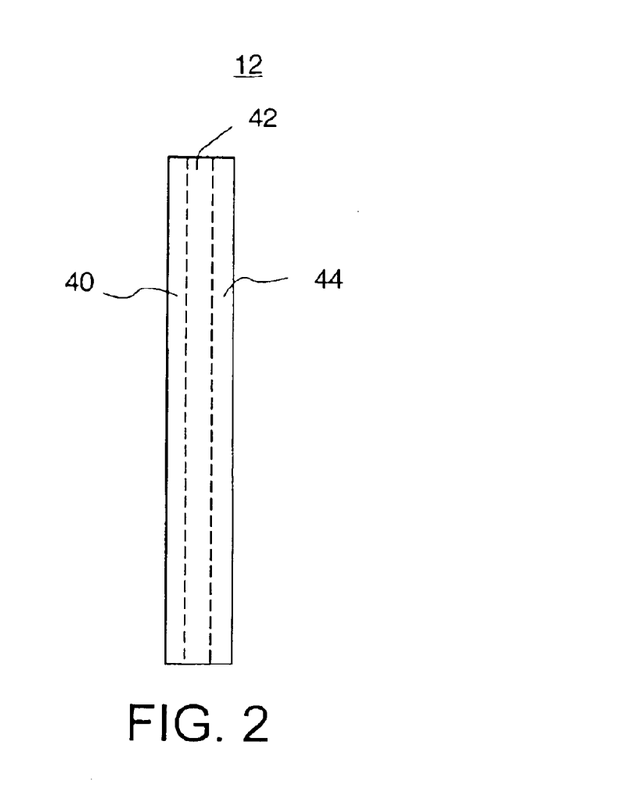
FIG. 2 is a schematic diagram of a cross section of the digital linear tape of FIG. 1.

Referring to FIG. 2, a cross section of the digital linear tape 12 of FIG. 1 includes a magnetic storage layer 40 applied to a plastic substrate 42 and forming a first major surface of the tape 12. A non-magnetic back layer 44, primarily composed of carbon black, is applied to the plastic substrate 42 and forms a second, opposing major surface of the tape 12.

Figure 3:
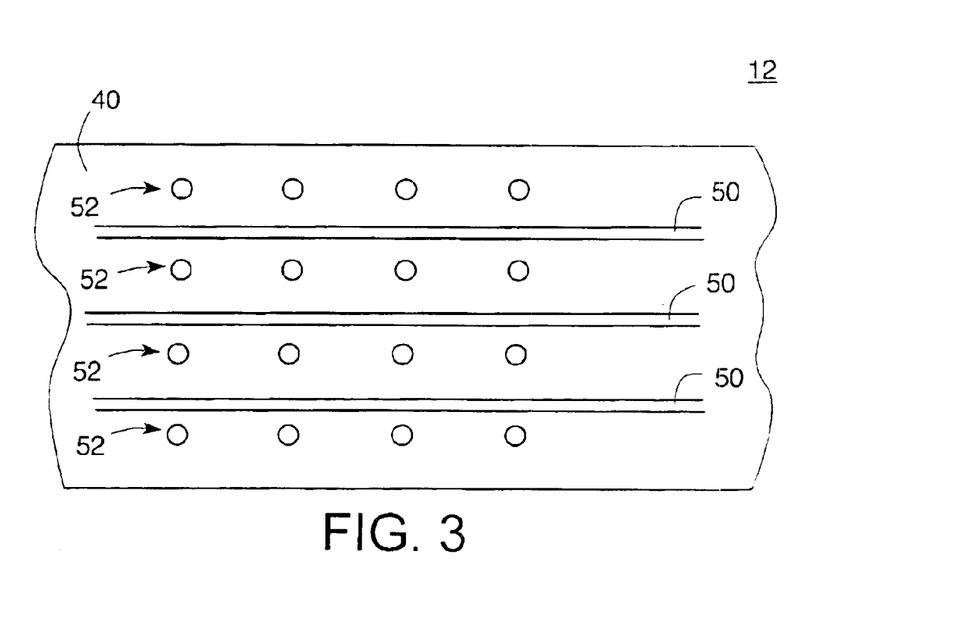
FIG. 3 is a schematic diagram of a front side of a digital linear tape having tracks of optical servo tracks.

Referring to FIG. 3, the magnetic storage layer 40 of the digital linear tape 12 provides for multiple linear magnetic data storage tracks 50, and includes multiple tracks of optical servo patterns 52. The tracks of optical servo patterns 52 are utilized by the magnetic tape system 10 to compensate for LTM, as will be described below. The recording head 22, also described below, includes multiple read and write heads referred to as recording channels aligned with some, but not all of the magnetic data storage tracks 50. For each of the data storage tracks 50 on the magnetic storage layer 40, there is provided a track of optical servo patterns 52 on the magnetic storage layer 40, so that if one recording channel follows the appropriate track of optical servo patterns 52 during linear tape movement, all the recording channels will follow their respective magnetic data storage tracks 50. The tracks of optical servo patterns 52 are formed as part of the tape manufacturing process. Conventional laser inscribing, embossing or patterning techniques may be used during tape manufacture to provide the tracks of optical servo patterns 52.

Figure 4:
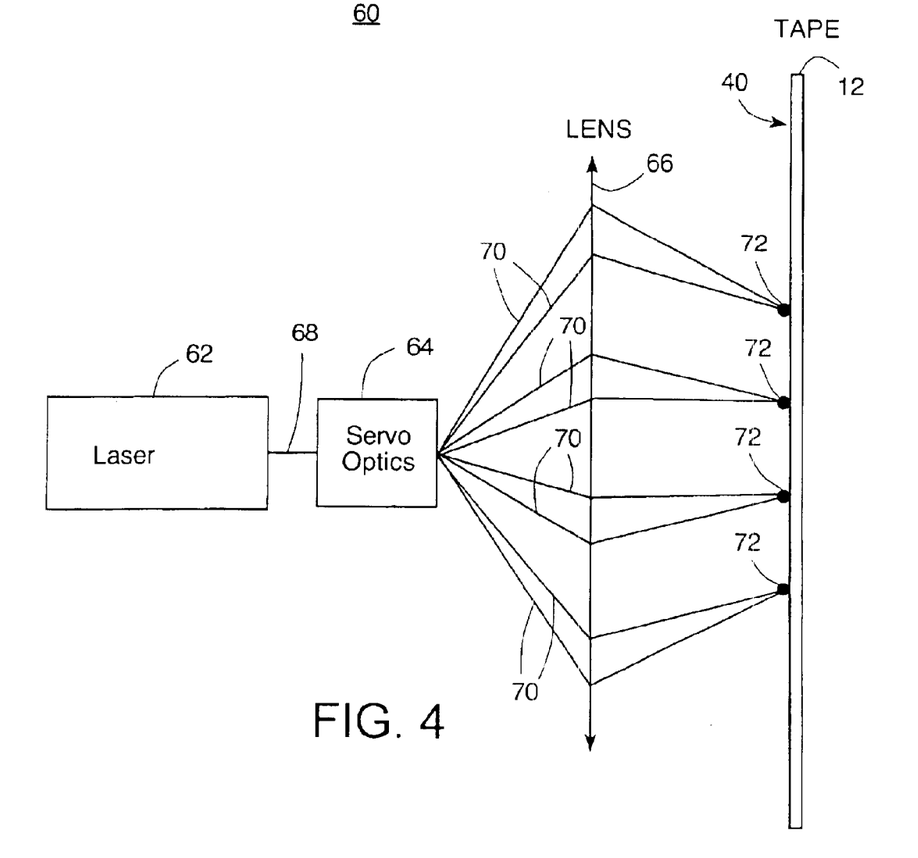
FIG. 4 is a block diagram of an exemplary optical servo pattern write system.

Referring to FIG. 4, an exemplary optical servo pattern writer system 60 includes a laser source 62, an optics system 64 and a lens 66. The laser source 62 generates one or more beams of collimated light 68. The collimated light 68 enters the optics system 64 where it is split into multiple beams 70. The multiple beams 70 are passed through the lens 66 and focused on the magnetic storage layer 40 of the tape 12. Upon hitting the tape 12, each of the multiple beams 70 removes pieces of magnetic material from the magnetic storage layer 40 of the tape 12, thus producing a depression absent of magnetic material that is each referred to as an optical servo mark 72. Multiple beams 70 hitting the tape 12 form multiple tracks of optical servo tracks arranged in parallel to each. The laser source 62 and optics system 64 may be controlled to generate a variety of optical servo mark patterns. For example, the laser source 62 may be pulsed to generate circular marks. Each track of optical servo patterns 52 may be encoded with a unique value or code that enables a recording channel to determine which nominal optical servo pattern track is being followed. For example, an electrical or magnetic signal of a specified frequency may be written over a selected track of optical servo pattern.

Figure 5:
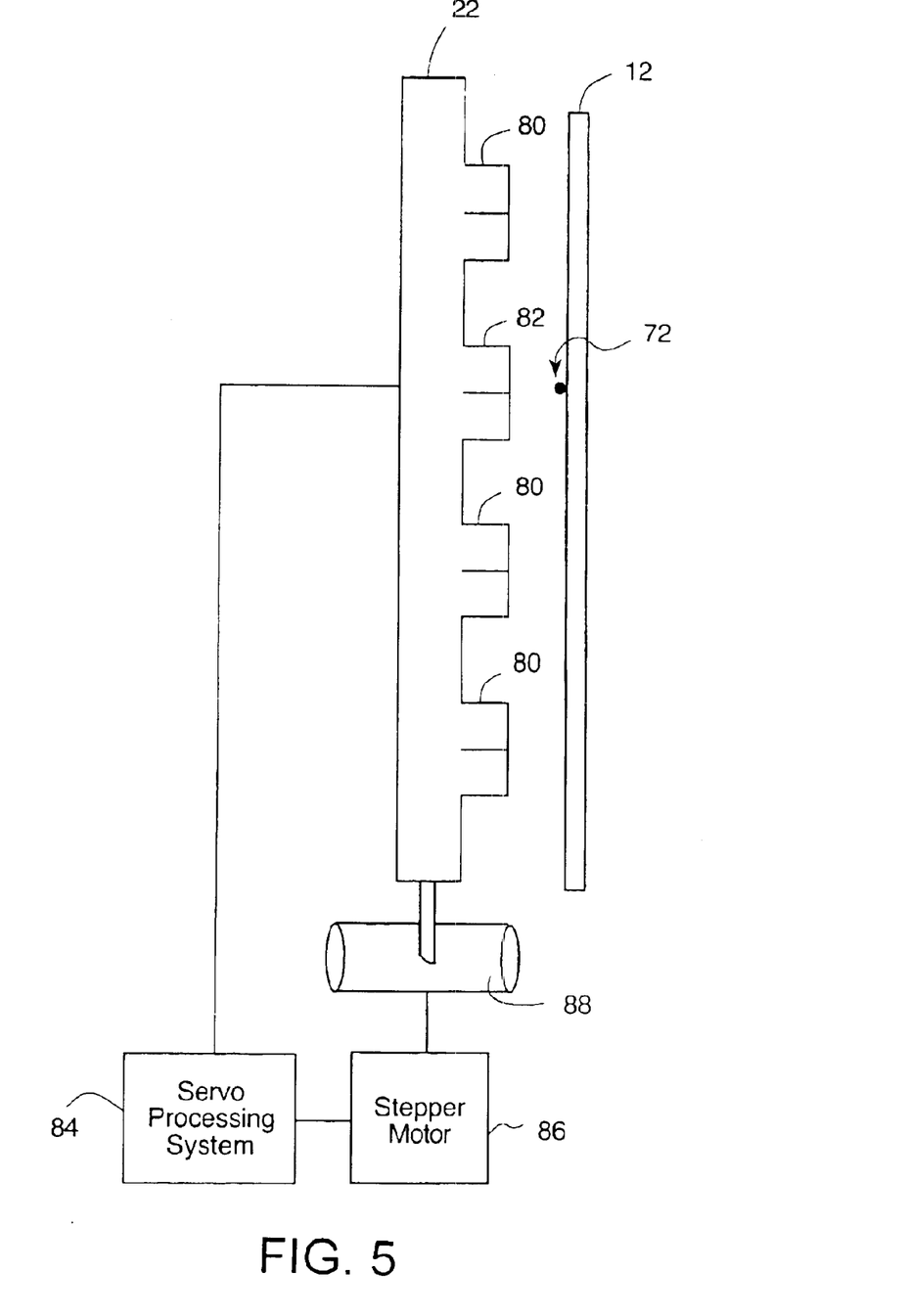
FIG. 5 is a block diagram of an exemplary magnetic tape servo system.

Referring to FIG. 5, the recording head 22 includes multiple recording channels 80 and one or more servo channels 82. The servo channels 82 perform writing and acquiring of servo position error signals in conjunction with the tracks of optical servo patterns 52 in which the magnetic recording material is missing causing an amplitude modulation. As mentioned above, the recording channels 80 read and write data in data tracks generally located longitudinally between the tracks of optical servo patterns 72. The servo channels 82 contain both read heads and write heads. A servo channel write head includes conventional inductive head whose width is approximately the same width as the recording channel write head. In an example, the servo channel read head is a center-tapped three terminal reader, such as a center tapped MR reader.

In operation, as the tape 12 travels across the recording head 22, the servo channel write head writes a magnetic signal over the track of optical servo patterns 52. The magnetic signal is applied on the optical servo patterns 52 by the servo channel write head. The magnetic signal is a signal tone of relatively low frequency, such as a signal tone in the AM radio frequency band. The amplitude of the magnetic signal tone decreases when applied over an optical servo pattern, or vanishes, depending on the depth of the optical servo pattern. Thus, the absence of magnetic material in the optical servo patterns 52, or spacing loss from the depth of the optical servo patterns 52, provide a frequency dropout that can be read by the servo channel read head as a modulation in amplitude.

Each of the servo channels 82 is connected to a servo processing system 84. The servo processing system 84 processes information received from each of the servo channels 82 and generates a position error signal (PES). The PES is used to compensate for misalignment of the servo channel 82 relative to the optical servo patterns 52. The PES is fed to a position motor 88 such as a voice coil activator that is connected to the recording head 22. The position motor 88 controls the lateral movement of the recording head 22 relative to the digital linear tape 12 to compensate for lateral tape motion (LTM) and thus insure that each of the recording channels is properly aligned with their respective track of data.

The position error signal (PES) can be generated from detecting the magnetic signal on the track of optical servo patterns 52, for example, by means of a servo channel having a center-taped (CT) reader.

Figure 6:
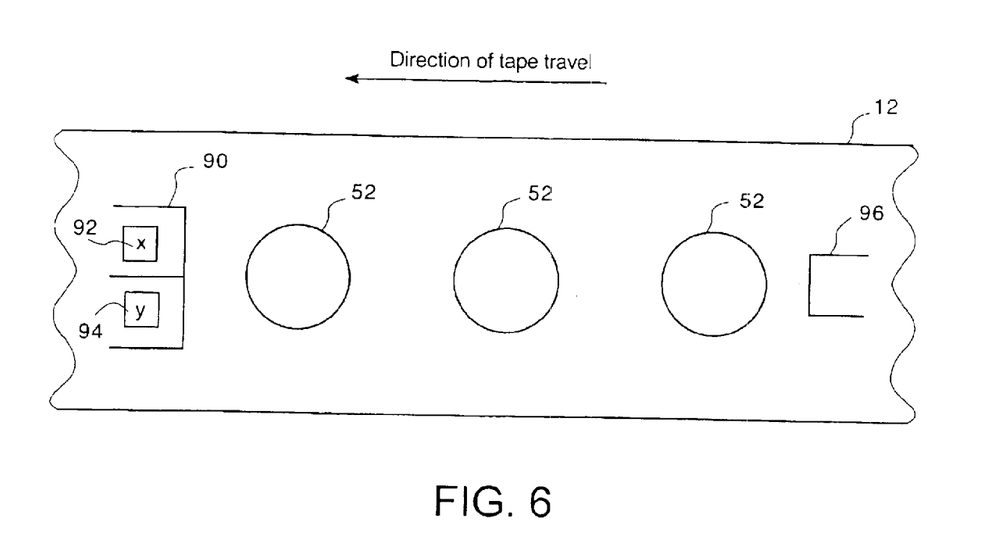
FIG. 6 is a schematic of a center-taped reader.

Referring now to FIG. 6, an exemplary CT reader 90 includes a reader head 92 and a reader head 94. As the tape moves across the servo channel and the recording channels, a servo channel write head 96 writes a signal tone over a track of optical servo patterns 52. The track of optical servo patterns 52 immediately passes under the reader head 92 and the reader head 94. The amplitude of the signals written by the servo channel write head 96 is detected by both the reader head 92 and the reader head 94. A change in amplitude of the signal tone received by the reader head 92 or the reader head 94 is high when the respective reader head sees more of the track of servo patterns 52 and decreases to a minimum when the respective reader head moves off the track of optical servo patterns 52. If the CT reader 90 is centered directly over the optical servo patterns as the tape goes by, the change in amplitude of the signals received by reader head 92 and reader head 94 will be the same and thus X=Y (or X−Y=0), where X equals the amplitude in mV detected by servo reader head 92 and Y equals the change in amplitude in mV detected by servo reader head 94. Accordingly, X−Y is an electrical signal whose magnitude and sign indicates how to center the recording head 22 relative to the track of optical servo marks 52 and consequently, tracks of data. X−Y represents a position error signal (PES) in which the resulting difference in mV can be related to position error in micrometers by scaling the signal with X+Y, and used to adjust the recording head 22 relative to the tape 12.

If the servo channel 90 is high relative to the optical servo patterns 52, Y>X (or X−Y<0), the recording head 22 should be moved down to center it over the tracks of optical servo patterns 52. The reason for this is that the magnetic signal is placed over the track of optical servo patterns 52 and thus the amplitude of the signal is greater as detected by reader head 94 than the amplitude of the signal detected by reader head 92. If the servo channel 90 is low relative to the optical servo patterns, X>Y (or X−Y>0), the recording head 22 should be moved up to center it over the track of optical servo marks 52.

The servo processing system 84 (of FIG. 5) receives the two amplitude signals X and Y as each of the optical servo patterns 52 on the tape 12 pass under the servo channel 90 and the reader head detects the magnetic signal and subtracts Y from X. If the difference is zero, no servo instruction is sent to the stepper motor 86. In the difference is greater than zero, the servo processing system 84 sends a servo instruction to the stepper motor 84 to drive the rotary motor 88 to cause the recording head 22 to move laterally down by a magnitude equal to the absolute value of the difference, converted to micrometers. In the difference is less than zero, the servo processing system 84 sends a servo instruction to the stepper motor 84 to drive the rotary motor 88 to cause the recording head 22 to move laterally up by a magnitude equal to the absolute value of the difference, converted to micrometers. As the tape 12 continues to move past the recording head 22, new amplitude signals X and Y are continuously detected each time one of the optical servo patterns 52 on the tape passes under the servo channel 90. Thus, the servo processing system 84 continuously analyzes the detected amplitude signal differences and provides positioning information to the position motor 88 to compensate for LTM.

Figure 7:
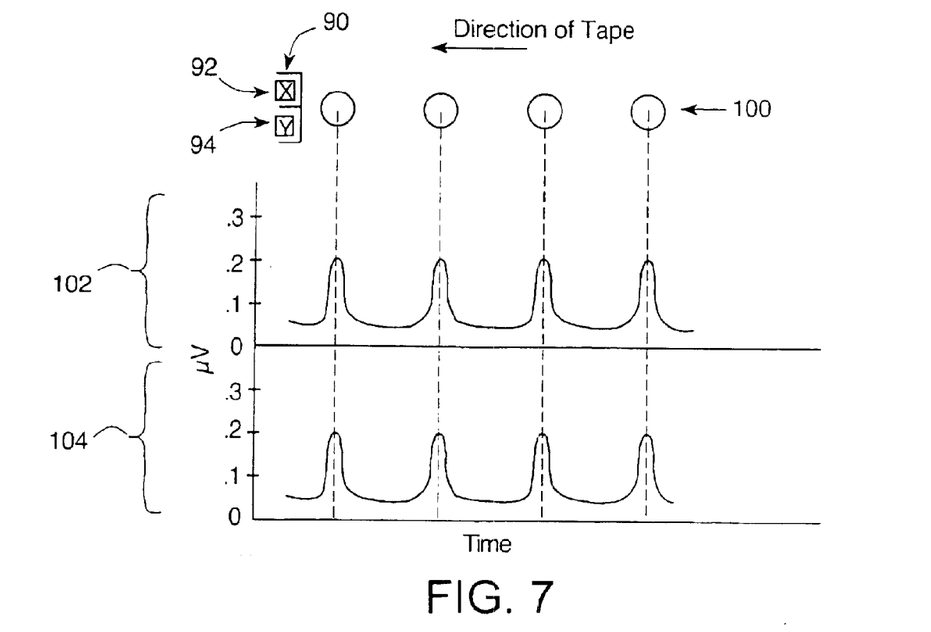
FIG. 7 is a first graph of voltage signal variation as produced by the center-taped reader of FIG. 6.

Referring to FIG. 7, the CT reader 90 is shown aligned to the track of optical servo patterns 100. As each of the optical servo patterns 100 passes by the CT reader 90 the magnetic signal on the patterns 100 is detected by the reader head 92 and reader head 94 and the detected amplitude of the signal shown on the graph. Graph 102 is the detected signal from reader head 92 and graph 104 is the detected signal from reader head 94. Each time one of the optical servo patterns passes the CT reader 90 the amplitude decreases and is detected by the reader heads 92 and 94. Since the detected signals are approximately equal, the CT reader 90, and consequently, the read/write head assembly, is properly aligned to the track of optical servo patterns 100.

Figure 8:
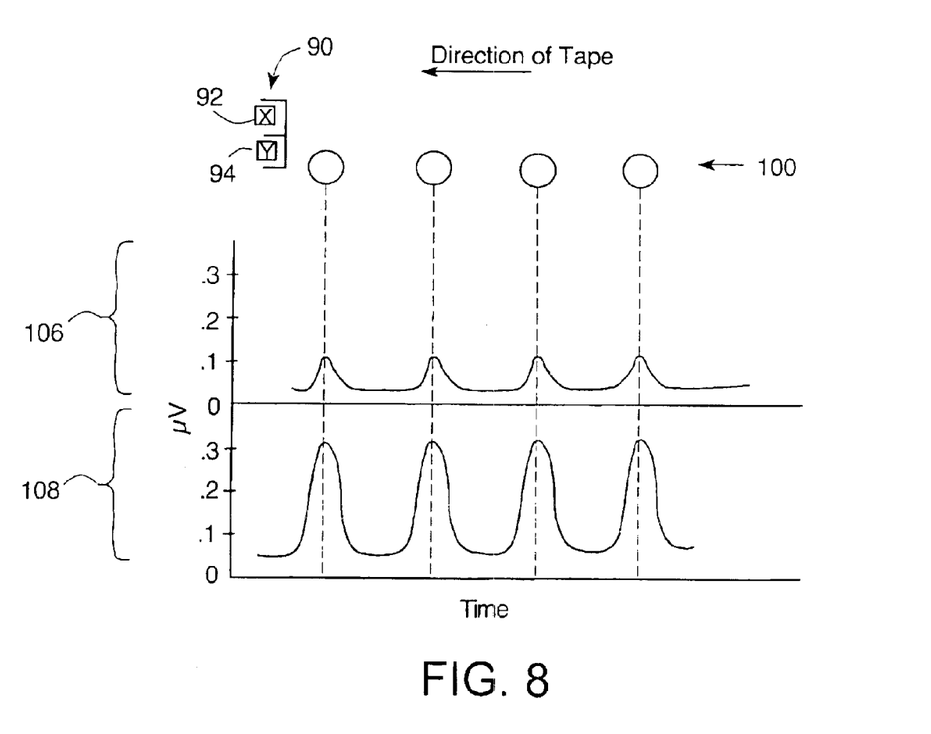
FIG. 8 is a second graph of voltage signal variation as produced by the center-taped reader of FIG. 6.

Referring to FIG. 8, the CT reader 90 is shown positioned slightly above the track of optical servo marks 100. As each of the optical servo patterns 100 passes by the CT reader 90 the magnetic signal on the patterns 100 is detected by the reader head 92 and reader head 94 and the detected amplitude of the signal shown on the graph. Graph 106 is the detected signal from reader head 92 and graph 108 is the signal detected from reader head 94. Each time one of the optical servo patterns passes the CT reader 90 the amplitude increases and is detected by the reader heads 92 and 94. Since the detected signal in graph 108 is greater than the detected signal in graph 109 the CT reader 90, and consequently, the read/write head assembly, needs to be moved laterally down relative the track of optical servo patterns 100 to be properly aligned.

Figure 9:
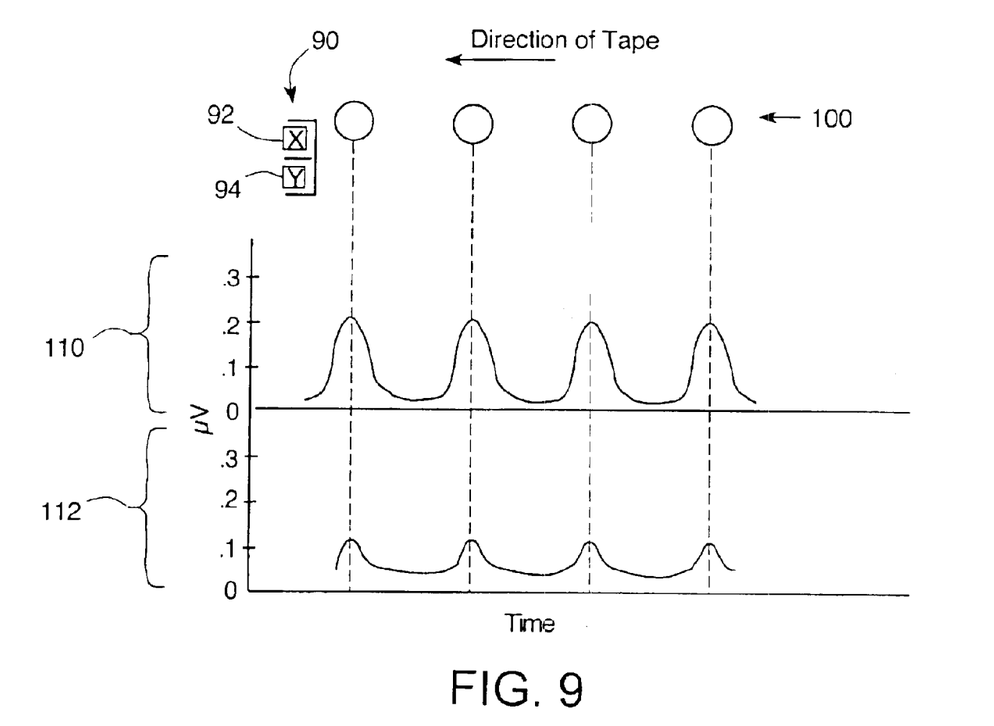
FIG. 9 is a third graph of voltage signal variation as produced by the center-typed reader of FIG. 6.

Referring to FIG. 9, the CT reader 90 is shown positioned slightly below the track of optical servo patterns 100. As each of the optical servo patterns 100 passes by the CT reader 90 the magnetic signal on the marks 100 is detected by the reader head 92 and reader head 94 and the detected amplitude of the signal shown on the graph. Graph 110 is the detected signal from reader head 92 and graph 112 is the signal detected from reader head 94. Each time one of the optical servo patterns passes the CT reader 90 the amplitude increases and is detected by the reader heads 92 and 94. Since the detected signal in graph 110 is greater than the detected signal in graph 112 the CT reader 90, and consequently, the read/write head assembly, needs to be moved laterally up relative the track of optical servo patterns 100 to be properly aligned.

Location information may also be written in the space between each of the optical servo patterns 52. For example, information about the track, band and position along the track may be written by the servo channel writer 96 (e.g., as variation of signal tones) and read with the X+Y signal of the trailing servo channel reader 90.

A number of embodiments of the invention have been described. Nevertheless, it will be understood that various modifications may be made without departing from the spirit and scope of the invention. For example, the magnetic signal over the optical servo patterns can be a head field applied when the servo patterns are generated by the optical servo writer system 60 in the manufacturing process.

A position error signal (PES) can be generated with a three or more segment tapped reader, producing three or more positional signals with respect to each optical servo pattern.

Once the magnetic signal is written on a given track of optical servo patterns 52, it is possible to use readers of two servo channels to give redundant position information or position plus azimuth information. The azimuth information can be used to dynamically center the azimuth of the magnetic recording unit. If the magnetic signal should be lost, it can be replaced by dynamically writing the magnetic information and only using the trailing servo channel reader to position the magnetic recording head unit.

Accordingly, other embodiments are within the scope of the following claims.

What is claimed is:

1. A method of aligning a magnetic read/write head to a plurality of data tracks on a magnetic surface of a digital linear tape comprising:
   writing a signal over a track of optical servo marks located on the magnetic surface of the tape with a servo channel writer;
   generating a position error signal from read back signals obtained from a servo channel reader, the servo channel reader including a first read head and a second read head for reading the signal written over the track of optical servo marks; and positioning the magnetic read/write head in accordance with the position error signal, wherein the read back signals include a first signal from the first read head and a second signal from the second read head, and the position error signal includes a difference between the first signal and the second signal, wherein an absolute value of the difference is a magnitude of an offset and a sign of the difference is a direction of the offset.

2. The method of claim 1 wherein the track of optical servo marks is applied during manufacture of the tape.

3. The method of claim 1 wherein the track of optical servo marks is formed by printing.

4. The method of claim 1 wherein the track of optical servo marks is formed by embossing.

5. The method of claim 1 wherein the track of optical servo marks is formed by patterning/ablation by a laser beam.

6. The method of claim 1 wherein the signal is produced by writing a DC signal.

7. The method of claim 1 wherein the signal is produced by writing an AC signal.

8. The method of claim 1 wherein the servo channel reader is a center-tapped reader having a first read head and a second read head.

9. The method of claim 1 wherein the magnitude is correlated to micrometers.

10. The method of claim 9 wherein positioning the magnetic read/write head in accordance with the position error signal comprises driving the read/write head up relative the track of optical servo marks if the sign is negative.

11. The method of claim 9 wherein positioning the magnetic read/write head in accordance with the position error signal comprises driving the read/write head down relative the track of optical servo marks if the sign is positive.

12. A magnetic recording head servo system comprises:

a plurality of recording channels;

at least one magnetic servo channel, the magnetic servo channel generating servo signals from a track of optical servo marks;

a servo processing system connected to the magnetic servo channel for processing the servo signals, wherein the servo processing system comprises:

means for determining a difference between amplitudes detected by heads, means for converting the difference into a linear position instruction, and means for sending the linear position instruction to the motor; and a motor connected and responsive to servo instructions received from the servo processing system, the motor controlling a position of the recording head servo system relative the position of the track of optical servo marks.

13. The system of claim 12 wherein the servo channel comprises:

a write head;

a first read head; and a second read head.

14. The system of claim 13 wherein the write head writes a signal tone. signal tone.

15. The system of claim 14 wherein the read heads detect amplitudes of a signal tone.

16. A method of aligning a magnetic read/write head to a digital linear tape comprising:

reading a signal disposed over a track of optical servo marks located on the magnetic surface of the tape with a servo channel reader, the servo channel reader including two laterally displaced read heads for reading the signal;

generating a position error signal from read back signals obtained from the servo channel reader; and positioning the magnetic read/write head in accordance with the position error signal.

17. The method of claim 16 wherein a magnitude of the position error signal is correlated to micrometers.

18. The method of claim 17 wherein positioning the magnetic read/write head in accordance with the position error signal comprises driving the read/write head up relative to the track of optical servo marks if the sign is negative.

19. The method of claim 17 wherein positioning the magnetic read/write head in accordance with the position error signal comprises driving the read/write head down relative to the track of optical servo marks if the sign is positive.

* * * * *